United States Patent Office 3,453,189
Patented July 1, 1969

---

3,453,189
ELECTROCHEMICAL ACYLOXYLATION PROCESS
Arthur M. Brownstein, Morristown, N.J., assignor to Princeton Chemical Research, Inc., Princeton, N.J., a corporation of New Jersey
Filed Oct. 19, 1966, Ser. No. 587,668
Int. Cl. C07d 1/12
U.S. Cl. 204—72    9 Claims This invention relates to the production of alkylene oxides. It more particularly refers to a process for producing intermediates useful in the production of alkylene oxides.

It is known that compounds having the general formula

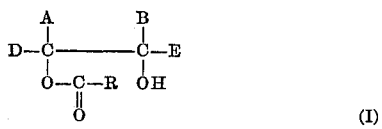

(I)

can be pyrolyzed to split off a carboxylic acid and leave an alkylene oxide residue. In the general Formula I, the substituents A, B, D and E may each represent hydrogen, alkyl, aryl or cycloalkyl groups.

It will be appreciated that alkylene oxides are chemical compounds having known utility in the production of esters and polyesters.

It would therefore be desirable, and it is an object of this invention, to provide means for producing hydroxy-acyloxy alkyl and substituted alkyl compounds, which can be pyrolyzed to produce alkylene oxides.

It is another object of this invention to provide a novel process for the production of hydroxy-acyloxy vicinal alkanes and substituted alkanes.

Other and additional objects of this invention will become apparent from a consideration of this entire specification, including the claims appended hereto.

In accord with and fulfilling these objects, one aspect of this invention resides in an electrolytic process for the production of compounds of the Formula I, i.e.,

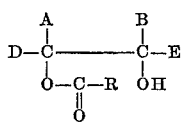

by subjecting an olefinic compound of the following general formula

(II)

to reaction with a metal salt of a carboxylic acid in an aqueous acid solution under the influence of electricity.

The carboxylic acid salts according to this invention are suitably alkali or alkaline earth metal salts. These metals are exemplified by lithium, potassium, sodium, calcium, magnesium, rubidium, cesium, strontium, barium, and radium. For reasons of economy, it is preferred to use the more common, lower molecular weight metals such as sodium, potassium, lithium, magnesium, and calcium.

The acyloxy moiety of the acid salt is the residue of a carboxylic acid of substantially unlimited chain length. By reason of economic availability, it is suitable to use any of the various fatty acids having up to about 22 carbon atoms. Naturally occurring and/or synthetically produced acids may be used. It is preferred in the practice of this invention that the acids are water-soluble, since this property facilitates salt production. Where practical or desirable, the acid may have substituent molecules attached thereto such as, for example, oxygen in the form of a carbonyl group as exemplified by acetyl acetic acid.

It will be appreciated that the acid or acid salt represents a recycled or recyclable moiety in the production of olefins by the practice of this invention, since the acyloxylated derivative produced by the electrolytic process described herein is subject to pyrolysis to produce the desired olefinically unsaturated compound and reconstitute the originally used acid. Thus, it will be appreciated that, while substantially any acid can be used, it is preferred to employ the most readily available and inexpensive carboxylic acid in the process, such as acetic acid. Other acids which could be used include propionic, butyric, octanoic, palmitic, stearic, etc.

As stated above, the substituents A, B, D and E may suitably be any organic moiety which does not either deactivate olefinic unsaturation or spatially hinder substitution of said olefinic unsaturation. For example, these substituents may be the same or different and may be hydrogen, methyl, ethyl, propyl, butyl, cyclohexyl, cycloheptyl, phenyl, toluyl, etc. In addition to these substituents, A, B, D and E may be joined together with the olefinically unsaturated carbon atoms of the Formula II into an unsaturated ring structure such as cyclohexene, cyclopentene, and cyclooctene, and the other substituents may be as stated above. Further in addition, these cycloaliphatic structures may themselves have substitution thereon such as lower alkyl, e.g., up to about 6 carbon atoms in normal or isomeric configuration, halogen atoms such as, for example, chlorine, bromine or iodine, or lower alkoxy groups having, for example, up to 6 carbon atoms.

Even in a situation where the substituents A, B, D and E are not part of a ring system, these substituents may themselves be nonhydrocarbon substituted such as, for example, with a halogen or a cyanide group.

The electrolytic reaction process of this invention is suitably carried out in carboxylic acid solution. While such is not imperative, it is preferred to provide the solvent carboxylic acid as the same moiety as the acyloxylating agent. This is preferred in order to simplify purification and resolution of the reaction mass and the reaction product. This carboxylic acid solvent moiety may be defined and exemplified of similar scope to the definition given above for the acid constituent of the acyloxylating agent.

The concentration of metal carboxylate in the reaction medium is suitably about 0.02 to 5 molar, preferably 0.1 to 1.5 molar. The concentration of the oxygen or sulfur containing reactant is suitably about 0.01 to 10 molar, preferably 0.02 to 5 molar.

The process is carried out at about 0 to 100° C., preferably about 15 to 50° C.; and under substantially any pressure considered desirable. Superatmospheric, atmospheric or vacuum operations are equally well suited to use in this invention.

Electrode current densities for use in the process of this invention are conveniently about 0.001 to 10 amperes per square centimeter, preferably about 0.01 to 4 amperes per square centimeter, with an anodic potential of about 0.1 to 2.5, preferably about 0.5 to 2.0 volts. Alternating or direct current can be used equally as well in this process. The electrodes may be made of substantially any suitably conductive, relatively inert material such as, for example, platinum or nickel.

This invention is illustrated by the following examples, which are not to be construed as being in any way restricting upon the scope thereof.

EXAMPLE I

A sealable, jacketed, glass lined reactor fitted with two platinum electrodes (1.3 square centimeter area) was charged with an acetic acid solution containing 1 molar sodium acetate and 3 weight percent water. The temperature of the mixture was adjusted to 30° C., and the system was pressurized with propylene to 10 atmospheres. The mixtures was vigorously agitated for five hours during which direct current was passed through the system. The anode potential was maintained at 1.0 volt with a current density of 2.5 amperes per square centimeter.

Excess gas was then vented from the system. The acetic acid was removed by flash evaporation and the semisolid residue consisted largely of 2-hydroxy-1-acetoxypropane. On treatment with a 10-percent aqueous sodium hydroxide, propylene oxide was formed in good yield.

EXAMPLE II

The procedure of Example I was repeated at atmospheric pressure with cyclohexene (0.1 molar). 1-acetoxy-2-hydroxycyclohexane was produced in good yield after three hours at an anode potential of 1.3 volts and a current density of 1.8 amperes per square centimeter. Treatment of the hydroxyacetate with 10-percent aqueous sodium hydroxide yielded cyclohexane oxide.

What is claimed is:

1. Process of producing acyloxy compounds which comprises dissolving a first reactant of the structure as illustrated by the following formula:

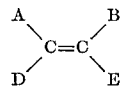

wherein A, B. D and E are each members selected from the group consisting of hydrogen, alkyl, cycloalkyl and aryl residues; dissolving as a second reactant a metal salt of a carboxylic acid in an aqueous solution; and passing an electric current through said solution under reaction conditions such that the acyloxy group of said carboxylic acid and a hydroxyl group substitute onto said first reactant across said olefinic unsaturation.

2. Process as claimed in claim 1, carried out at a temperature of about 0 to 100° C., a current density of about 0.001 to 10 amperes per square centimeter and an anodic potential of about 0.1 to 2.5 volts.

3. Process as claimed in claim 1, carried out at a temperature of about 15 to 50° C., a current density of about 0.01 to 4 amperes per square centimeter and an anodic potential of about 0.5 to 2.0 volts.

4. Process as claimed in claim 2, wherein the alkyl is selected from at least one member of the group consisting of methyl, ethyl, propyl and butyl.

5. Process as claimed in claim 2, wherein said aryl is selected from at least one member of the group consisting of phenyl, toluyl, and halide phenyl.

6. Process as claimed in claim 2, wherein said cycloalkyl is selected from the group consisting of cyclohexyl, cycloheptyl, lower alkyl-substituted cycloheptyl, halide-substituted cycloheptyl, and halide-substituted cyclohexyl.

7. Process as claimed in claim 2, wherein said substituents A, B, D and E form together with said unsaturated carbon atoms a compound selected from the group consisting of cycloalkene and substituted cycloalkene.

8. Process as claimed in claim 7, wherein said cycloalkene is halide-substituted.

9. Process as claimed in claim 1, including, in addition, pyrolysis of said hydroxy-acyloxy compound product to produce the corresponding alkylene oxide.

References Cited

UNITED STATES PATENTS 3,252,876   5/1966   Koehl _____ 204—59
3,252,878   5/1967   Koehl _____ 204—59

HOWARD S. WILLIAMS, *Primary Examiner.*

H. M. FLOURNOY, *Assistant Examiner.*